Sept. 15, 1959  A. U. BRYANT  2,904,306
VALVE BODY CONSTRUCTION
Filed March 31, 1955  4 Sheets-Sheet 1
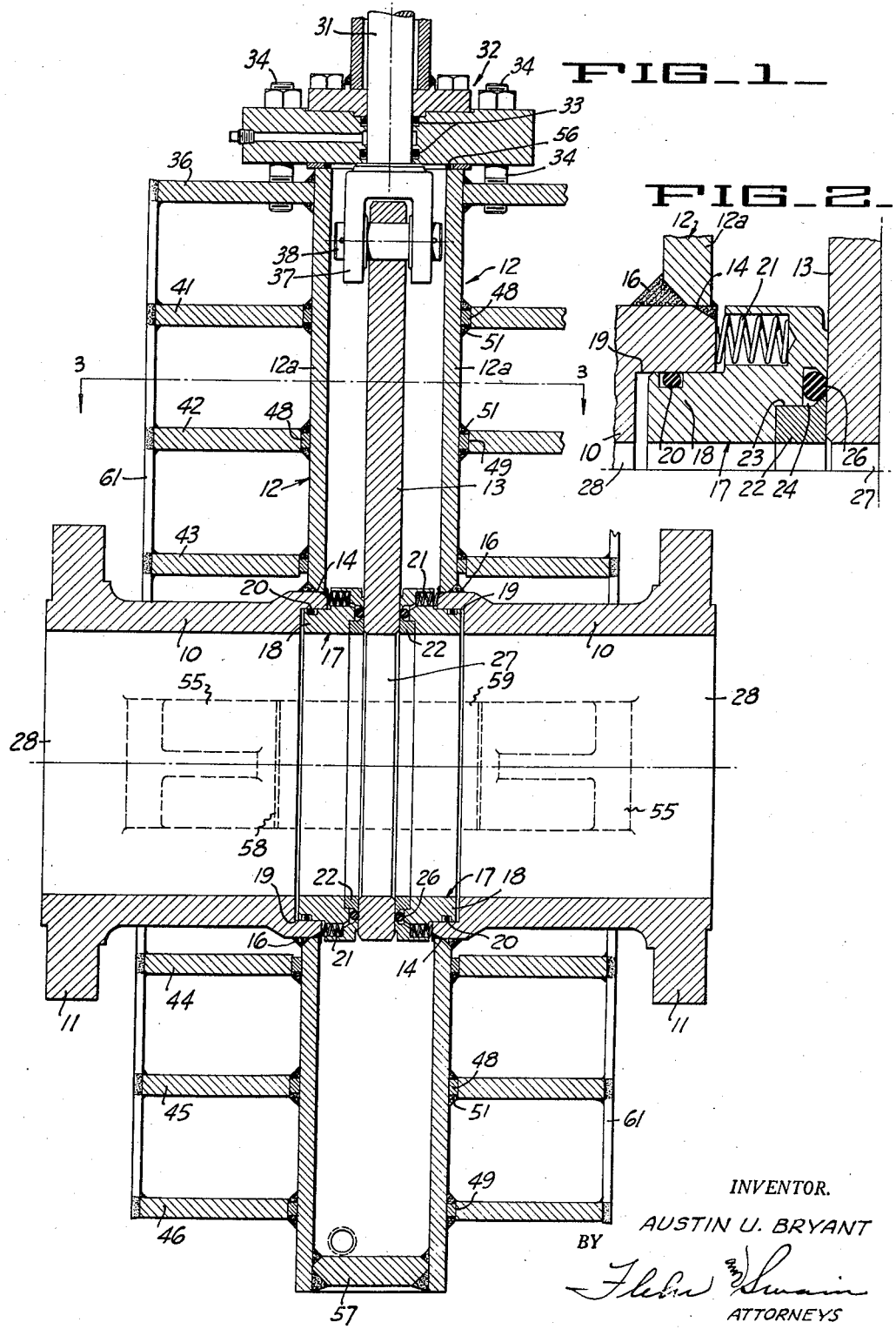
INVENTOR.
AUSTIN U. BRYANT
BY
ATTORNEYS Sept. 15, 1959  A. U. BRYANT  2,904,306
VALVE BODY CONSTRUCTION
Filed March 31, 1955  4 Sheets-Sheet 2
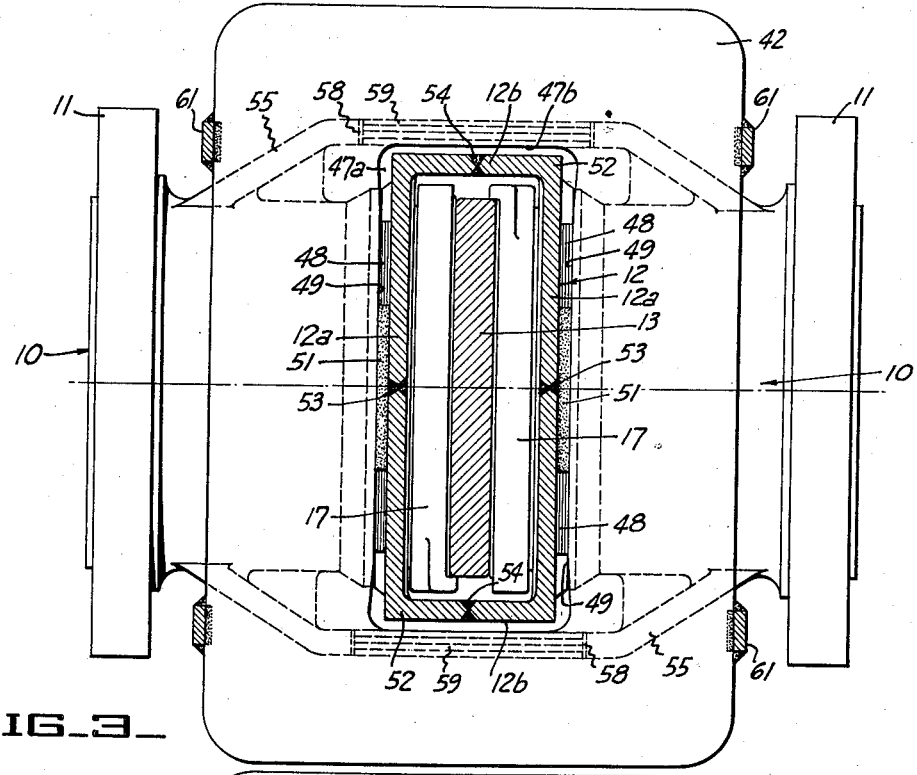
FIG_3_
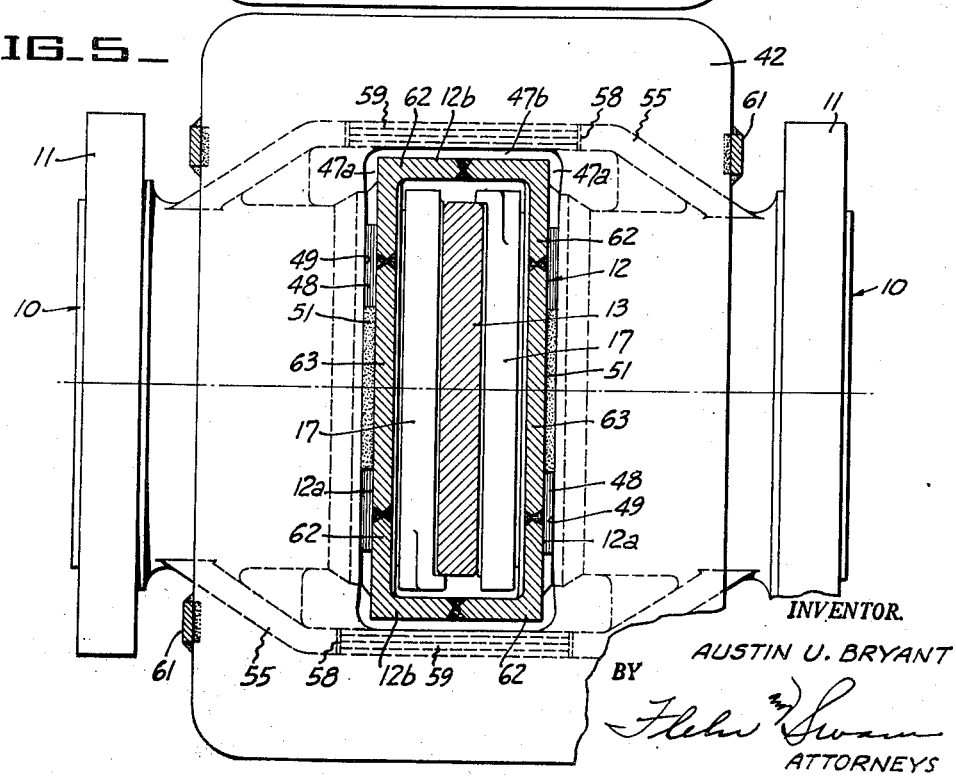
FIG_5_
INVENTOR.
AUSTIN U. BRYANT
BY
ATTORNEYS Sept. 15, 1959 A. U. BRYANT 2,904,306
VALVE BODY CONSTRUCTION
Filed March 31, 1955 4 Sheets-Sheet 3
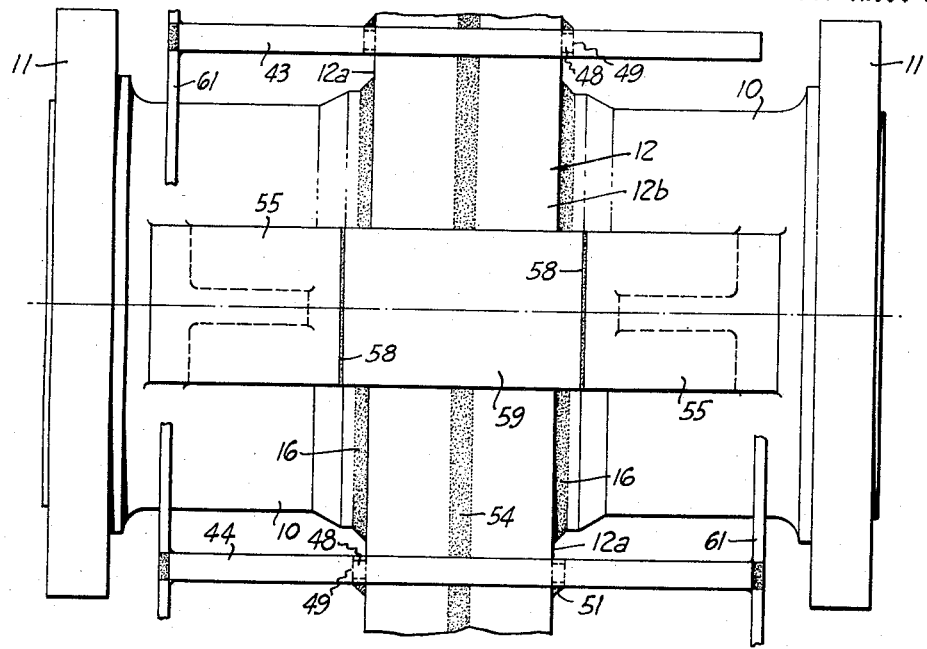
FIG_4_
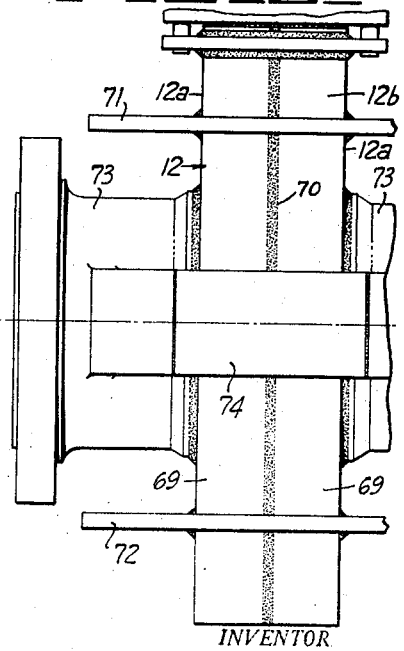
FIG_6_
INVENTOR
AUSTIN U. BRYANT
BY
ATTORNEYS

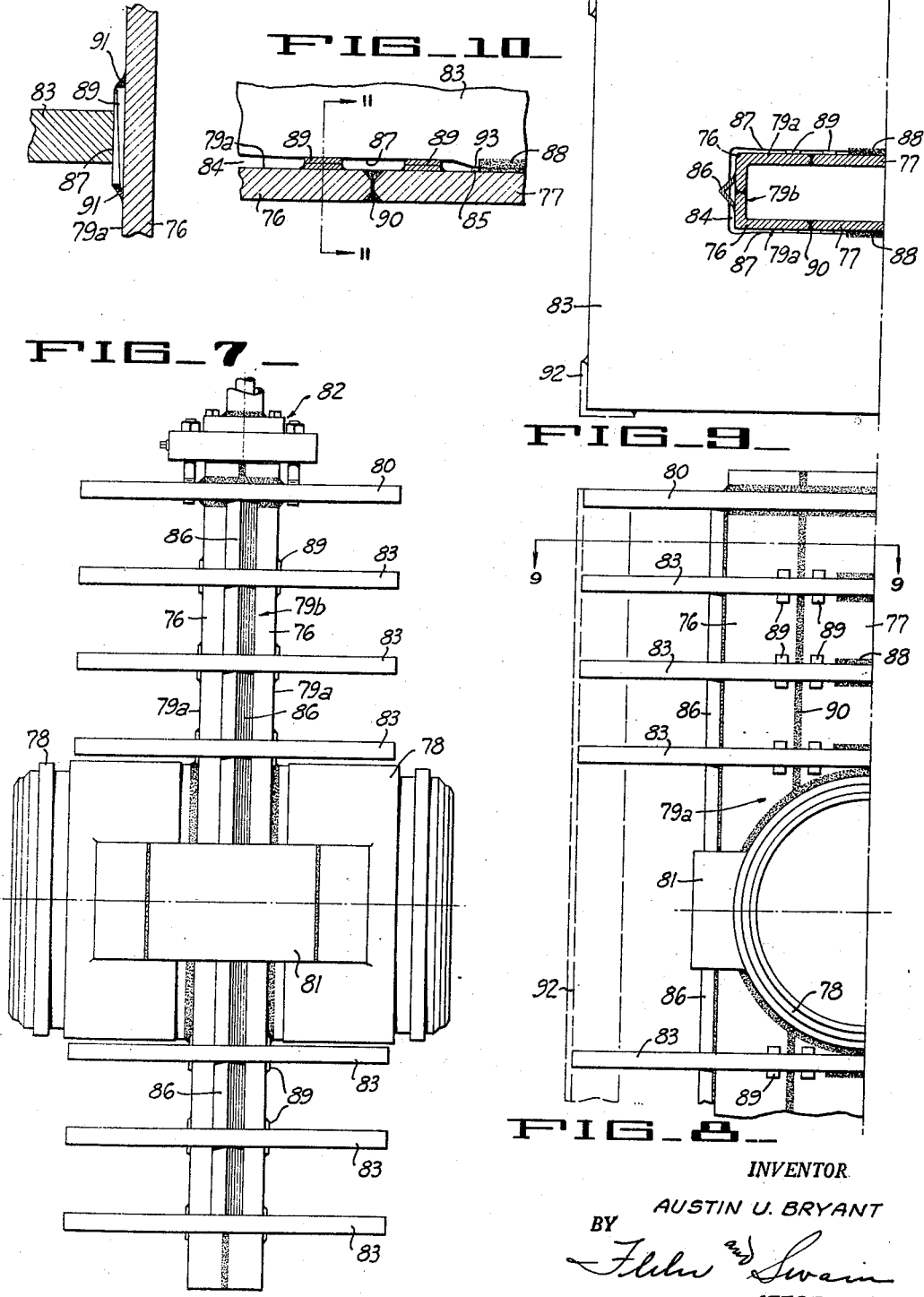

United States Patent Office 2,904,306
Patented Sept. 15, 1959

2,904,306

VALVE BODY CONSTRUCTION

Austin U. Bryant, Walnut Creek, Calif., assignor, by mesne assignments, to Walworth Company, New York, N.Y., a corporation of Massachusetts Application March 31, 1955, Serial No. 498,253

5 Claims. (Cl. 251—367)

This invention relates generally to the construction of valves for controlling fluid flow.

In construction of commercial valves of the gate type, it has been common practice to cast the body integral with short conduit sections or hubs, which serve to connect the valve to associated piping. Particularly for the higher operating pressure, the larger sized valves made in this manner become relatively heavy and costly because the wall thickness of the casting must be considerably greater than theoretically required to resist the line pressure. Also suitable large castings are difficult to obtain when it is necessary to conform to high quality specifications. It is common for steel castings to have blow holes or porous spots, which result in a high percentage of rejects, or expensive welding and remachining operations where the defects are of such a nature that they may be repaired. Some efforts have been made to produce the pipe sections and the body as separate castings, which are welded together during manufacture. This practice requires exacting welding operations which are difficult to make in commercial practice, and although it somewhat simplifies the castings required, it does not greatly overcome the difficulties described above.

In general it is an object of the invention to provide a novel body construction which permits manufacture of valves in the larger sizes without excessive weight.

It is another object of the invention to provide a new valve construction which permits production of the hubs separate from the main body part, with a minimum final machining after the hubs are attached to the body.

Another object of the invention is to provide a fabricated valve body construction which is capable of resisting relatively high line pressures, as for example, line pressures ranging up to 3,500 p.s.i. or higher.

Additional objects and features of the invention will appear from the following description in which the preferred embodiments have been shown in detail in conjunction with the accompanying drawings.

Referring to the drawings:

Figure 1 is a side elevation view in section illustrating a valve of the gate type incorporating the present invention.

Figure 2 is a detail in section showing means for establishing a seal with respect to the movable valve gate.

Figure 3 is a cross sectional view taken along the line 3—3 of Figure 1.

Figure 4 is a side elevation view showing the sides of the hubs and adjacent portions of the body.

Figure 5 is a view similar to Figure 3, but showing another embodiment of the invention.

Figure 6 is a side elevational view showing another embodiment of the invention.

Figure 7 is a side elevational view illustrating another embodiment of the invention.

Figure 8 is an enlarged detail, looking toward the front of a portion of the body.

Figure 9 is a cross-sectional view taken along the line 9—9 of Figure 8.

Figure 10 is an enlarged cross-sectional detail illustrating the manner in which each hoop-like member is engaged with the associated front wall of the body.

Figure 11 is a cross-sectional detail taken along the line 11—11 of Figure 10.

The construction illustrated in Figure 1 consists of aligned hubs 10 which may be made of cast steel, and which can be provided with flanges 11 to facilitate coupling to associated piping. The main part 12 of the valve body which houses the valve gate 13, is fabricated from steel members as will be presently described. The shaping of the body is such as to provide the spaced parallel front walls 12a, and these walls in the course of manufacturing the body are provided with aligned openings 14 for receiving the hubs. The hubs are permanently attached to the front walls by suitable weld connections 16.

The inner opposed ends of the hubs 10 carry means for establishing seals with respect to the gate 13. The present invention is not concerned with the particular means used for this purpose. However, suitable means is illustrated in Figure 2. It consists of a metal ring 17 having a portion 18 of reduced exterior diameter, which is adapted to interfit the cylindrical bore 19 in the corresponding hub 10. Suitable seal means such as the resilient seal ring 20 of the O-ring type, serves to establish a seal between portion 18 and the hub. A plurality of compression springs 21 serve to urge each ring 17 against the gate 13. An inner seat ring 22 is fitted within the bore 23 formed in each ring 17. The rings 17 and 22 are machined to provide the annular recess or groove 24, which accommodates the resilient seal ring 6 of the O-ring type. Normally the urge of the springs 21 is such that one side of the O-ring 26 is pressed into sealing contact with the adjacent side faces of the gate 13.

For open position of the valve the port 27 in the gate 13 is in registry with the passages 28 in the hubs 10. The gate is moved downwardly to bring it to full close position.

Conventional means, forming no part of the present invention, can be used for the moving of the gate between open and close position. Figure 1 illustrates a valve operating rod 31 extending to the interior of the body through the bonnet assembly 32. The bonnet assembly in this instance includes sealing means 33 of the resilient O-ring type, and is secured to the body by the bolts 34 and the body flange 36. The inner end of the rod 31 is provided with a forked portion 37, that is attached to the corresponding end of the gate by means of a pin 38.

The body construction in this instance forms a pressure vessel which is rectangular in section and which has means for bracing the front walls 12a against internal pressure. The bracing means is in the form of hoop-like members which extend about the body and which have stress carrying engagement with the front walls 12a. In the particular embodiment illustrated in Figure 1, the bracing means for the upper part of the body consists of the members 41, 42 and 43, and for the lower part of the body, members 44, 45 and 46. Each of these members can be formed from suitable plate stock, shaped generally rectangular, and having a rectangular shaped opening to accommodate the body. This opening in each instance is dimensioned to provide the clearances or spaces 47a and 47b along the front and side walls 12a and 12b. Metal stress carrying members 48, which may be in the form of metal strips, are inserted between the faces 49 of each of the hoop like members, and the adjacent parallel face of the corresponding front wall 12a. Weld connections 51 are then applied to form an attachment to the body walls 12a and to likewise retain the strips 48 in place. The weld connections are of sufficient length to retain the hoop like members upon the body, but they terminate short of the sides of the body, as shown in Figure 3.

It will be noted that the brace members do not bear upon the body except through the medium of strips 48, and weld connections 51 and these strips are in contact only with the front walls 12a of the body.

Flange 36 is shown dimensioned similar to the brace members, whereby it functions in part as a bracing means for the body.

The main part of the body 12 is preferably fabricated from relatively simple structural shapes. Thus, as illustrated in Figure 3, the main part of the body consists of four structural steel angles 52, which are secured together by weld connections 53 and 54 to form a substantially rectangular box. The flange 36 is attached to one end of this assembly. A seal is provided between the end of the body and the bonnet assembly by suitable means such as the seal ring 56 of the O-ring type. The body is closed at the other end of the pressure vessel by means of the closure plate 57, which is attached by suitable welding. Each one of the structural steel angles 52 forms a corner for the body as illustrated in Figure 3.

It is desirable to provide a direct strengthening tie connection between the hubs, exterior of the body. For this purpose each hub is provided with pads 55 on opposite sides of the same and these pads are secured by weld connections 58 to the rigid tie straps 59. The straps may be laminated, and they form a direct rigid connection between the two hubs.

The hoop-like members may be connected by straps 61 to brace them against lateral deflection.

The valve body construction described above has a number of inherent advantages. Except for the hubs, the body is constructed entirely by fabricating methods from readily available structural steel members, such as steel angles. The body is capable of withstanding comparatively high internal pressures without utilizing excessive wall thicknesses. The front walls 12a of the body are braced against bulging by the hoop-like members, and stresses applied to these members are not transmitted to other parts of the body. The construction is particularly advantageous for valves of the larger sizes, where conventional cast steel bodies for comparable working pressures are particularly heavy and troublesome.

As illustrated in Figure 5 the body is fabricated from angles and steel plates in place of the angles illustrated in Figure 3. Thus the body is formed from four angles 62 together with the flat plates 63. These parts are secured by suitable welding to form the boxlike form shown in Figure 5. Here again the hoop-like members 41—46 engage the front walls of the body, to brace the same against outward bulging when the body is subjected to internal pressure.

Figure 6 illustrates a body construction using two channels 69, having their flanges secured together by the weld connection 70. The front walls of the body are formed by the webs of the channels and are shown reinforced by the two hoop-like members 71 and 72, which are attached in the same manner as the hoop-like members previously described. In addition the hubs 73 are rigidly connected by the tie bars 74 the same as in Figure 4.

Figures 7 to 11, inclusive, illustrate another embodiment of the invention which is somewhat similar to the embodiment of Figure 1, but with additional features. The body in this instance is made from the structural steel angles 76 and the flat steel plates 77, which are welded together to form a body that is rectangular in section. The hubs 78 are welded into the front walls 79a of the body. Also the hubs are directly connected by the tie bars 81.

A flange 80 is welded to one end of the body and serves to mount the bonnet 82. The hoop-like members 83 are distributed along both extensions of the body, and are formed of steel plate of suitable thickness. The opening 84 in each hoop-like member is somewhat larger than the exterior dimensions of the body, to thereby provide a clearance about the body in the manner illustrated in Figure 9. Spacers 86, which may be structural angles, are provided along the end walls 79b of the body, and serve to facilitate assembly and to maintain a predetermined spacing between the hoop-like members. The spacers can be retained in place by suitable weld connections. A convenient assembly procedure is to first attach the spacers 86 adjacent to tie bars 81. Then assuming that one first proceeds to apply the hoop-like members on the bonnet end of the body, the first member 83 is slipped over the body, and brought to rest in a contact with the spacers 86. After this member has been attached to the body, the next set of spacers 83 are applied, and then the next hoop-like member positioned and secured to the body. The flange 80, which is dimensioned in the same manner as the hoop-like members 83, is the last member to be applied.

Instead of using the simple strips 48 shown in Figure 1, in Figures 7 to 11, inclusive, suitable shim strips 85 are inserted between the inner surfaces 93 of the hoop-like members (Figure 10) and each adjacent front wall 79a. Thereafter weld metal 88 is applied to form a permanent connection and to retain the shims in place. Additional shims 89 are shown applied between the inner surfaces 87 of each hoop-like member, and the front walls 79a, in areas on opposite sides of the weld connections 90 between the angles 76 and the plates 77. The shims 89 may be tapered as illustrated, thereby forming wedges which can be forced in place to form load transmitting bearing surfaces. After placing the shims 89 they are permanently secured together and to the adjacent front wall 79a, by weld metal 91 (Figure 11).

After being assembled upon the body extensions, the outer portions of the hoop-like members can be connected together to minimize lateral deflection. In this instance structural steel angles 92 are shown extending the length of the body and applied over the corners of the hoop-like members. The angles are secured to each of the hoop-like members by weld connections.

As in Figure 1 the hoop-like members 83 are not connected to the body except along regions corresponding to the central portions of the front walls 79a. Portions of the front walls extending from the weld connections 88 toward the end walls of the body are braced by the shims 89, but these shims establish only load bearing engagement, and do not provide direct connections.

In the forms of the invention shown in Figures 1–5 the weld connections are made considerably shorter than the width of the body. The length of members 48 (Figure 3) is such as to properly transmit stress from the front walls of the body to the hoop-like members. In Figures 9 and 10 the shims 85, plus the shims 89, transmit such stresses. In Figures 9 and 10 two sets of shims 89 are located at each side of weld connection 90 to accommodate the weld between parts 76 and 77, which may not be flush. A limited length for the direct weld connections between the hoop-like members and the front walls of the body is desirable for the larger sized valves, where a long weld connection would be subject to severe shear stresses. For the smaller sized valves these weld connections can be extended as to length in proportion to the width of the body.

I claim:

1. In a valve construction, a body formed from steel walls welded together and including flat spaced parallel front walls provided with aligned openings, said body being substantially rectangular in section and having portions extending from opposite sides of the openings, pipe coupling hubs secured to said front walls in alignment with said openings, a plurality of hoop-like steel plates each having a substantially rectangular opening therein to accommodate a portion of the body, each of said plates having a width as measured from the periphery of the opening to the outer edge of the same that is many times the thickness of the plate, each of said extending portions of the body having a plurality of said hoop-like plates disposed thereon and spaced longitudinally of the body, two of the plates being in close proximity with the adjacent sides of the hubs, weld connections between the front walls and the adjacent inner edges of each of said plates, whereby the front walls are braced against internal pressure, tie straps extending across the sides of the body between said two hoop-like plates, and rigid connections between the ends of said tie straps and the adjacent portions of the hub, whereby said tie straps form direct rigid connections between the hubs.

2. In a valve construction, a body formed from steel walls welded together and including flat spaced parallel front walls provided with aligned openings, said body being substantially rectangular in section, pipe coupling hubs secured to said front walls in alignment with said openings, at least one flat hoop-like steel plate having a substantially rectangular opening therein and disposed with a portion of said body positioned within said opening, said plate having an effective width as measured from the periphery of the opening to the outer edge of the plate that is many times the thickness of the plate, and thrust transmitting connections between the front walls and the adjacent inner edges of said plate whereby the front walls are braced against outward bulging, said last means comprising direct weld connections between the front walls and the adjacent inner peripheral edges of the hoop-like plate, said weld connections terminating short of the longitudinal corners and the side walls of the body, whereby said corners and side walls of the body are free of rigid connection with said hoop-like plate.

3. In a valve construction, a body formed from steel walls welded together and including spaced parallel front walls provided with aligned openings, said body having portions extending on both sides of the hub and being substantially rectangular in section, pipe coupling hubs secured to said front walls in alignment with said openings, a plurality of flat hoop-like steel plates each having a substantially rectangular opening therein to accommodate a portion of the body, each plate having a width as measured from the periphery of the opening to the outer peripheral edge of the plate that is many times the plate thickness, said hoop-like plates being spaced longitudinally of the body, and weld connections between the front walls and the adjacent inner edges of said plates, whereby said hoop-like plates brace said front walls against internal pressure, said weld connections terminating short of the longitudinal corners and the side walls of the body, whereby said longitudinal corners and said side walls are free of rigid connection with said hoop-like plates.

4. In a valve construction, a body formed from steel walls welded together, said walls including spaced parallel front walls provided with aligned openings and parallel side walls, said body being substantially rectangular in section, pipe coupling hubs secured to said front walls and aligned with said openings, pads disposed on opposite sides of the hubs, said pads projecting laterally from the hubs beyond the projected planes of the side walls, the extremities of said pads on each side of the body being in a plane spaced outwardly from the corresponding side wall and extending for a substantial distance parallel to said longitudinal corners, and rigid tie straps in the form of flat rectanguler steel plates disposed adjacent to and parallel to the side walls of the body, said plates having the ends of the same welded to said pads, said straps forming direct rigid connections between the hubs through said pads, said tie straps and pads being free from direct attachment with the side walls and longitudinal corners of the body.

5. In a valve construction, a body formed from metal side and front walls, the front walls being substantially flat and parallel and provided with aligned openings, said body being substantially rectangular in section, pipe coupling hubs secured to said front walls in alignment with said openings, at least one flat hoop-like metal plate having a substantially rectangular opening therein and disposed with a portion of said body positioned within said opening, said plate having an effective width as measured from the periphery of the opening to the outer edge of the plate that is many times the thickness of the plate, and thrust transmitting connections between the front walls and the adjacent inner edges of said plate whereby the front walls are braced against outward bulging, said last means comprising direct weld connections between the front walls and the adjacent inner peripheral edges of the hoop-like plate, said weld connections terminating short of the longitudinal corners and the side walls of the body, whereby said corners and side walls of the body are free of rigid connection with said hoop-like plate.

References Cited in the file of this patent

UNITED STATES PATENTS

| | | |
|---|---|---|
| 560,659 | Stern | May 26, 1896 |
| 2,208,180 | Delleani | July 16, 1940 |
| 2,683,581 | Rovang | July 13, 1954 |

FOREIGN PATENTS

| | | |
|---|---|---|
| 410,124 | Italy | Mar. 23, 1945 |
| 508,384 | Belgium | Jan. 31, 1952 |
| 142,600 | Sweden | Oct. 20, 1953 |